United States Patent
Sinclair et al.

(10) Patent No.: US 6,657,634 B1
(45) Date of Patent: Dec. 2, 2003

(54) DYNAMIC GRAPHICS AND/OR VIDEO MEMORY POWER REDUCING CIRCUIT AND METHOD

(75) Inventors: David E. Sinclair, Markham (CA); Eric Young, Scarborough (CA)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/257,291

(22) Filed: Feb. 25, 1999

(51) Int. Cl.[7] .......................................... G06F 13/372
(52) U.S. Cl. ..................... 345/534; 345/545; 713/320; 713/324; 365/227; 365/229
(58) Field of Search ................. 345/531, 545, 345/535, 501, 534, 519; 713/300, 320, 322–324; 365/266–229

(56) References Cited

U.S. PATENT DOCUMENTS

| | | |
|---|---|---|
| 5,675,808 A | 10/1997 | Gulick et al. |
| 5,752,045 A * | 5/1998 | Chen .......................... 713/322 |
| 5,781,496 A * | 7/1998 | Pinkham et al. ....... 365/230.03 |
| 5,781,768 A | 7/1998 | Jones, Jr. |
| 5,804,749 A | 9/1998 | Shirakawa et al. |
| 5,835,435 A * | 11/1998 | Bogin et al. ................. 365/227 |
| 5,907,330 A * | 5/1999 | Simmers ...................... 345/501 |
| 6,067,083 A | 5/2000 | Glen et al. |
| 6,073,223 A | 6/2000 | McAllister et al. |
| 6,079,025 A | 6/2000 | Fung |
| 6,112,310 A | 8/2000 | Jun et al. |
| 6,177,946 B1 | 1/2001 | Sinclair et al. |
| 6,209,075 B1 | 3/2001 | Lau |
| 6,263,448 B1 | 7/2001 | Tsern et al. |
| 6,292,201 B1 * | 9/2001 | Chen et al. .................. 345/519 |

* cited by examiner

Primary Examiner—Kee M. Tung
(74) Attorney, Agent, or Firm—Vedder, Price, Kaufman & Kammholz, P.C.

(57) ABSTRACT

An apparatus and method dynamically controls the graphics and/or video memory power dynamically during idle periods of the memory interface during active system modes. In one embodiment, a memory request detector generates memory request indication data, such as data representing whether memory requests have been received within a predetermined time, based on detection of graphics and/or video memory requests during an active mode of the display system operation. A dynamic activity based memory power controller analyzes the memory request indication data and controls the power consumption of the graphics and/or video memory based on whether memory requests are detected.

32 Claims, 5 Drawing Sheets

DYNAMIC GRAPHICS AND/OR VIDEO MEMORY POWER REDUCING CIRCUIT AND METHOD

RELATED CO-PENDING APPLICATION

This is a related application to co-pending application entitled "Dynamic Memory Clock Control System and Method" having Ser. No. 09/130,746 filed on Aug. 7, 1998 and assigned to instant assignee and incorporated herein by reference.

FIELD OF THE INVENTION

The invention relates generally to circuits and methods for reducing power consumption for electronic circuits, and more particularly to circuits and methods that control a memory clock and/or memory controller to reduce power consumption.

BACKGROUND OF THE INVENTION

Portable electronic devices such as notebook computers, personal organizers, portable telecommunication equipment and other electronic devices consume much power during their display mode. By way of example, graphics control chips for laptop computers may be integrated circuits having synchronous dynamic RAM (SDRAM) on the same die as the memory controller and other video and graphics processors. For example, a conventional type of graphics control chip may include a number of memory access request circuits (or access request engines) such as a video capture engine, a two dimensional and three dimensional drawing engine, a display engine, a video playback engine, a host processor, onboard SDRAM, SGRAM or other RAM serving as the frame buffer memory, a memory controller and a phase lock loop circuit (PLL) for generating a memory clock. As known in the art, each engine may have another clock, other than the memory clock, such as from another PLL or external clock, creating a clock boundary. Graphics control chips typically also include another phase lock loop circuit for generating a clock for a display device (or devices) such as a CRT that may plug into the laptop computer or an LCD display that is mounted to the laptop computer. A central processing unit (CPU) of the computer interfaces with the graphics chip and other peripheral devices as known in the art. A laptop computer or a portable device may include a TV tuner or video decoder, as part of a multimedia package, that sends video information to the video capture engine for eventual display on the LCD display after being stored in the memory.

With chips such as graphics controller chips, the many graphic engines attempt to access the memory to perform their necessary operations. However, only one of the graphic engines can typically access the memory at a given time. In addition, multiple memory controllers may be configured to access different portions of memory at the same time. Some of the display operations require real-time processing, such as video capture operation, display operation and video playback, so that real-time display can occur on the LCD display. For example, where the TV tuner is applying video to the video capture engine, the video should be processed in real-time to facilitate display in real-time which is necessary, for example, for live performances or when the TV tuner is providing live feed. Hence, this engine has a higher priority over, for example, a 2D or 3D drawing engine which may be slightly delayed and still provide the user with high performance on display times.

A problem arises with such devices since power consumption and thermal dissipation need to be minimized for portable devices without unnecessarily sacrificing operational performance. The power dissipation of a graphics control chip and other integrated circuits is typically related to the operational activity of memory. Conventional portable display systems typically have power management systems that generate system level standby/suspend commands. During system level standby/suspend modes, graphics controller subsystems and other subsystems may typically respond by forcing the frame buffer memory into a low power self refresh mode for the duration of the system level standby/suspend mode. This may be done for example by pulling a memory clock enable line low and other suitable pins to put the memory in a self refresh mode. The synchronous memories are designed to switch into energy savings modes based on the level of the memory clock enable signal.

FIG. 1 shows, by way of example, a block diagram of a portable display system, such as a laptop computer, a handheld processing device, telecommunication device or any other suitable portable display device, that generates graphics and/or video display information to a display device and employs system level standby/suspend power management control. When the display system is a laptop computer, such systems typically include an operating system 10 that operates under control of a central processing unit, for example, and a power management control system 12 which then generates a suspend/standby command 14 to a memory controller 16. The memory controller 16 then generates a clock enable/disable signal 18 to, for example, control a memory clock enable pin (and/or other pins) on a graphics memory device 20 to put the synchronous memory in a self refresh mode during the system level standby/suspend mode (e.g., the inactive mode). The graphics memory device 20 may be, for example, an SDAM, SGRAM or any other suitable graphics and/or video memory device. The operating system 10 generates a suspend/standby command 22 when, for example, the laptop computer is in a standby/suspend mode as activated through a graphic user interface or software controlled timer. Accordingly, such systems can reduce the power of the graphic subsystem which includes the synchronous memories used for frame buffer operations. A clock enable signal 18 is typically the memory clock enable 10 on the memory device 20. This control typically only puts the SGRAM or memory device in a low power mode when the graphic system is completely idle. When the operating system 10 indicates that the display is in the active mode (e.g., the display is enabled), the memories are typically always enabled.

As such, video and/or graphics memories are controlled through a memory clock enable signal to effectively power down the memory during operating system controlled suspend/standby conditions, such as when the display is disabled. However, such systems do not typically provide power reduction for frame buffer memory during the active operational mode of the system. As such, various memory request engines 24a through 24n, although in the active mode, may not be generating memory requests to memory controller 16. Hence, memory 20 will have its clock enable active and thereby will unnecessarily consume power. Conventional, portable display systems typically, in a static screen display mode for example, still keep the memory 20 in the active mode. With ever increasing power demands of portable display systems due to increased functionality that is continually being added, power consumption reduction becomes an increasingly important requirement to save battery life of the portable display device and need to meet subsystem thermal requirements that become increasingly important as larger density circuits are needed.

Consequently, there exists a need for a dynamic power reduction circuit that can reduce power consumption and power dissipation without unnecessarily degrading system performance during active system modes. It would be advantageous, if such a system could detect memory access demand and automatically adjust memory operation accordingly to facilitate power reduction.

DETAILED DESCRIPTION OF A PREFERRED EMBODIMENT OF THE INVENTION

Briefly, an apparatus and method dynamically controls the graphics and/or video memory power dynamically during idle periods of the memory interface during active system modes. In one embodiment, a memory request detector generates memory request indication data, such as data representing whether memory requests have been received within a predetermined time period, based on detection of graphics and/or video memory requests during an active mode of the display system operation. A memory request includes for example, any form of data request from memory such as reads or writes. A dynamic activity based memory power controller analyzes the memory request indication data and controls the power consumption of the graphics and/or video memory based on whether memory requests are detected. In one embodiment, the internal memory clock for the memory is gated through suitable logic to stop the internal memory clock to reduce power consumption of the frame buffer memory. The active mode power reduction control takes into account read and write latency periods to insure that a read or write is completed prior to reducing the memory power consumption.

For example, the dynamic memory based power controller controls a memory clock enable pin, such as pulling the pin low, when a memory state machine is idle and enables the memory clock pin when a request for memory is detected. This includes enabling for screen refresh requests or other data requests. Significant power savings can be achieved, for example, when the display system is in a static display made as the memory(ies) can be idle a large portion of the time. The system may be applicable to display systems having one or more memories and the dynamic memory activity power controller and memory request detector may be incorporated if desired, as part of a memory control subsystem.

Figure 1:
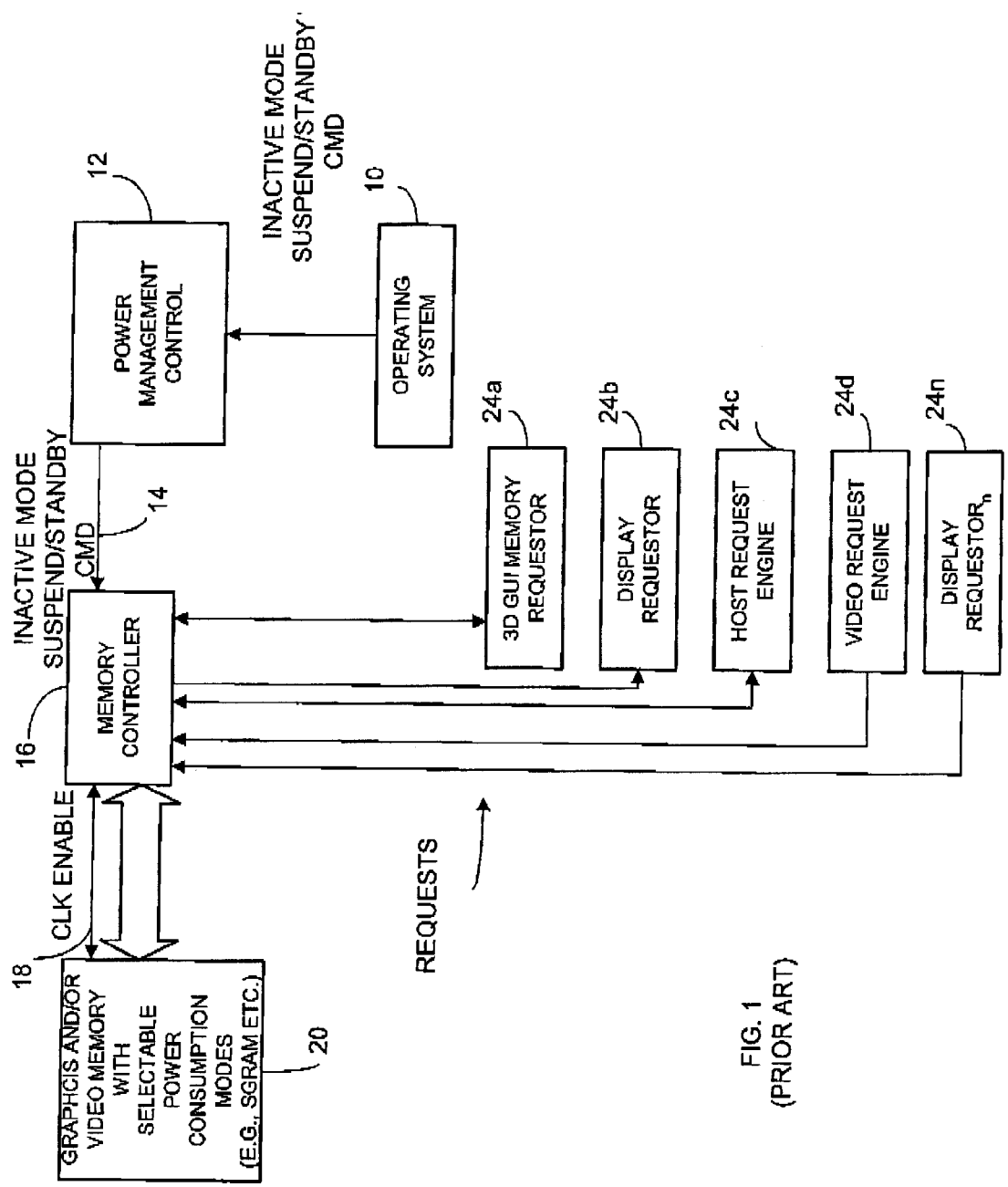
FIG. 1 is a diagram illustrating an embodiment of a conventional display system for a portable display device.
Figure 2:
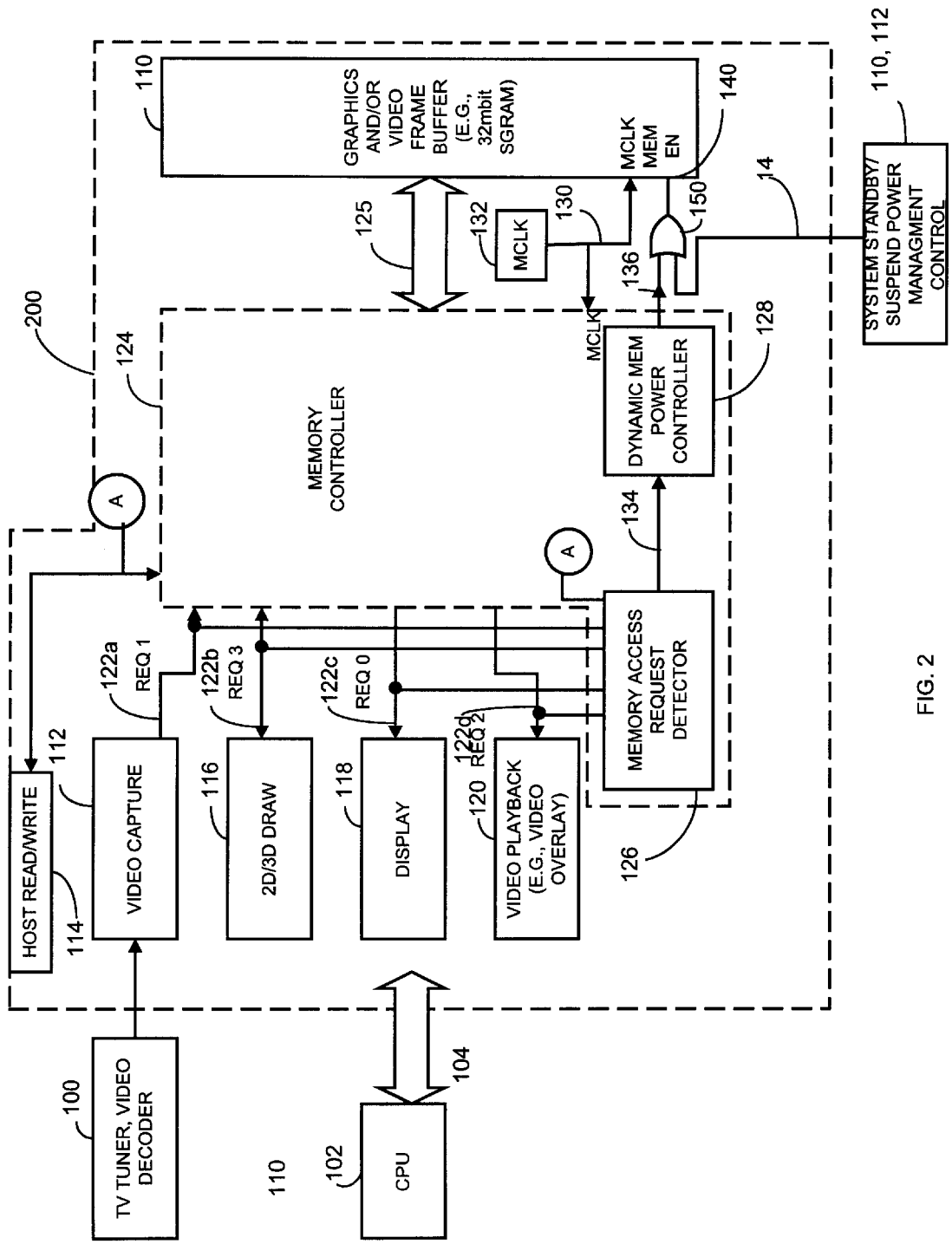
FIG. 2 is a block diagram illustrating one embodiment of activity based dynamic graphics and/or video memory power reducing circuit in accordance with one embodiment of the invention.

FIG. 2 shows a video and/or graphics subsystem 200 that may be employed, for example, on a laptop computer or other suitable portable display device. The graphics and/or video display subsystem 200 may be operatively coupled to receive video data from a video source, such as a TV tuner 100 as well as control information and other data from a central processing unit of the system, such as CPU 102 through a suitable bus 104. Graphics data may be received from any suitable graphics data provider or engine. The graphics and/or video display subsystem 200 includes a frame buffer 110 that may be, for example, a 32 megabit SGRAM, or any other suitable memory. For example, the frame buffer 110 may be a number KM4132G112 CMOS SGRAM available from Samsung Electronics, or any other suitable memory. As known in the art, such memories may include circuitry that is activated through a memory clock enable pin and other requisite pins so that the synchronous memory may be selectively activated in a standby self refresh power down mode or other suitable power reduction modes.

The graphics and/or video display subsystem 200 may include a plurality of memory request engines such as a video capture engine 112, a host CPU read write memory requestor 114, a two dimensional and/or three dimensional drawing engine 116, a display engine 118, and a video playback engine 120, or any suitable memory request engines. The memory request engines, as known in the art, generate respective memory request signals 122a through 122d. The memory request signals are typically received by a memory controller 124 that obtains data from, or stores data in, the frame buffer 110 through a suitable bus 125 in response to the memory request signals 122a through 122d.

In this embodiment, the memory controller 124 is a memory controller with dynamic memory activity-based memory power control in accordance with the invention. It will be recognized, however, that the dynamic memory activity-based memory power control may also be incorporated in any other suitable functional block or portion of functional blocks in a display system or a stand alone controller if desired. The memory controller 124 includes a memory access request detector 126 operatively coupled to a dynamic memory power controller 128. The subsystem 200 also receives memory clock signal 130 from a suitable memory clock source 132. The memory clock signal 130 is supplied to the frame buffer 110 and the memory controller 124 to provide suitable synchronization between the memory controller 124 and the frame buffer 110 as known in the art. The memory access request detector 126 generates memory request indication data 134 for the dynamic memory activity-based power controller 128. The dynamic memory activity-based power controller 128 dynamically controls the power consumption of the graphics and/or video frame buffer memory 110 through a control signal 136 based on whether memory requests are detected by the memory access request detector 126.

In one embodiment, the dynamic memory activity-based power controller 128 reduces the power consumption of the graphics and/or video memory frame buffer 110 based on active mode memory request inactivity. For example, the dynamic memory activity based power controller 128 will reduce the power consumption of the memory 110 during system active modes based on how often memory requests are detected by the memory access request detector 126. The request indication data 134 may be any suitable data to indicate to the dynamic memory power controller 128 to reduce power. In this embodiment, memory power is reduced by effectively shutting off an internal memory clock signal inside the memory.

If, the frame buffer 110 is a separate die having a memory clock enable input 140, the dynamic memory power controller 128 generates control signal 136 to control memory clock enable input to reduce power consumption of the graphics and/or video memory 110. However, it will be recognized that the control signal 136 may be any suitable information such as other information stored in a programmable register to control the power consumption of the frame buffer 110, if, for example, the frame buffer is incorporated as part of a memory controller or integrated in some other manner.

In an alternative embodiment, the dynamic memory power controller 128 may include the memory access request detector 126 to directly detect memory requests from a plurality of memory requests generators 122a through 122d. As described above, the dynamic memory power controller 128 shown in FIG. 2 indirectly detects memory requests based on a indication data 134 or ready signal from the dynamic memory activity based power controller 128. In addition, a more simple state machine may also be employed to provide the functionality of the memory access request detector 126 and the dynamic memory activity based power controller 128 as described below.

Figure 3:
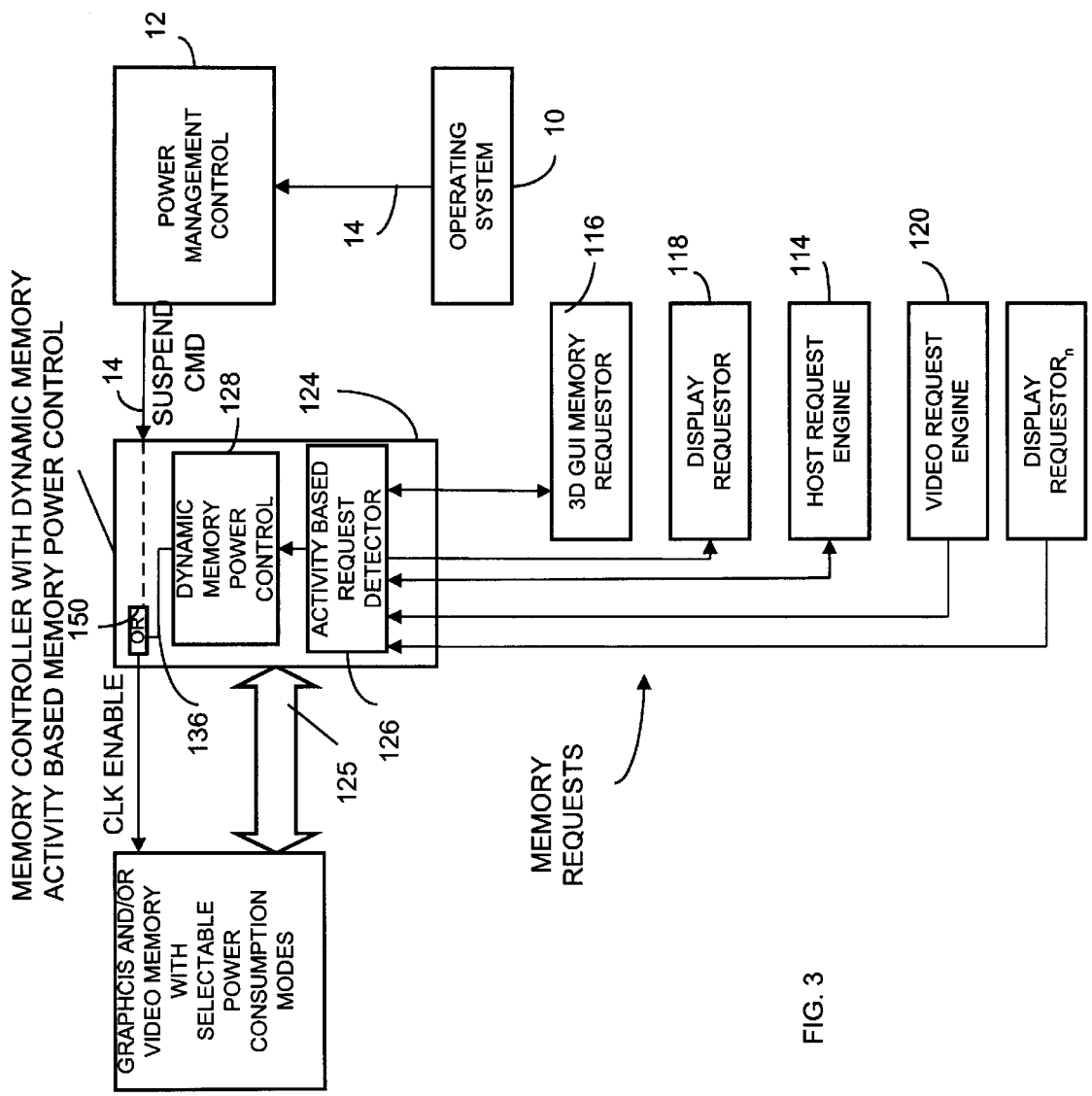
FIG. 3 is a block diagram illustrating in more detail the system of FIG. 2.

The memory controller 124 may also include a logic OR operation indicated as 150 which receives the system-based suspend/standby command signal 14 and the control signal 136 generated by the subsystem 200 to dynamically control the memory 110 based on memory request activity such that the memory clock enable input 140 is controlled by either the system-based standby/suspend command or the dynamic memory activity-based memory power control. Incorporation of the OR operation into the memory controller 124 is shown, for example, in FIG. 3.

The memory request detector 126 may be any suitable logic that facilitates the detection as to whether the memory access request is being generated by one or more of a plurality of memory request engines. As such, the memory access request detector may be simple OR logic which generates an output if any of the memory request engines are requesting access to the memory 110. During the active system mode operation, the request indication data indicates that at least one memory request is being generated so that the frame buffer memory 110 should be active to accommodate access for communication with the memory controller 124.

Figure 4:
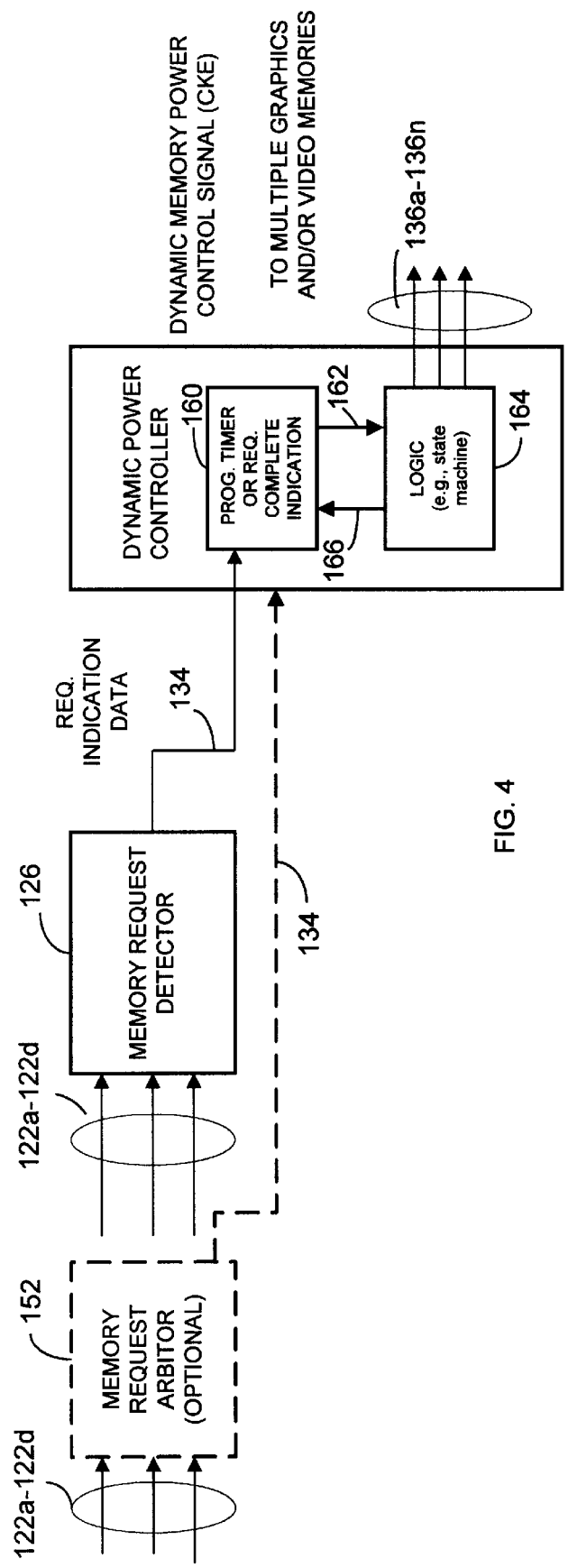
FIG. 4 is a block diagram illustrating one example of a memory controller with dynamic memory activity based power control in accordance with one embodiment of the invention.

FIG. 4 shows one example of one embodiment of a dynamic memory activity based power controller 128 in a subsystem including an optional memory request arbiter 152. As shown, the dynamic power memory controller 128 may be operatively coupled to a plurality of graphics and/or video memories so that the dynamic power controller 128 may selectively reduce the power in any suitable graphic and/or video memory during the active mode of the system. As such, the dynamic power controller 128 may generate a plurality of control signals 136a through 136n for the respective memories.

As shown, the memory request arbiter 152 may be any suitable logic which arbitrates among requests 122a through 122d, giving priority, for example, to real time request engine requests over a non-real time request engine so that the memory request arbiter outputs an indication that a specific request was detected. This request may serve as the request indication data 134. Alternatively, the memory request arbiter 152 may output an actual request of the engine who was allowed priority. The memory request detector 126 then determines whether a suitable number of requests have been received to activate the memory. As such, the memory request detector 126 may receive other data indicating whether a request has been generated.

The dynamic power controller 128 may have a programmable timer or other suitable control logic that is operatively responsive to the memory request indication data 134. The control logic may include, by way of example, a programmable timer 160 that is reset each time a request is detected by virtue of the request indication data 134. As such, the programmable timer 160 may be preset to a predefined count that represents for example a suitable read or write latency period. When the timer times out, indicating that memory inactivity has occurred and the latency period is over, the internal memory clock is effectively disabled through a memory clock enable pin or other suitable mechanism. As such, the indication data is received and counter reset information or other request activity information 162 is sent to a state machine 164 other suitable logic which may then send timer reset data 166 back to the counter when a request (or suitable number of requests) is detected. As such, the programmable timer 160 is subsequently reset through the timer reset data 166 from the state machine 164 after a predetermined period of memory request inactivity. It will be recognized that any suitable inactivity detection may be used. The memory request detector 126 detects, for example, a static display screen condition or other frame buffer non-activity mode during the system active mode to facilitate dynamic power reduction.

The memory request detector 126 in the embodiment where request arbiter 152 is used, allows the request arbiter 152 to arbitrate among a plurality of graphic and/or video memory requests prior to the memory request detector 126 generating memory request indication data 134 to the dynamic power controller 128, the graphics and/or video subsystem 200 may be employed as a graphics processing system for a suitable display device such as a portable laptop computer, hand held telecommunication device or any other suitable device.

Figure 5:
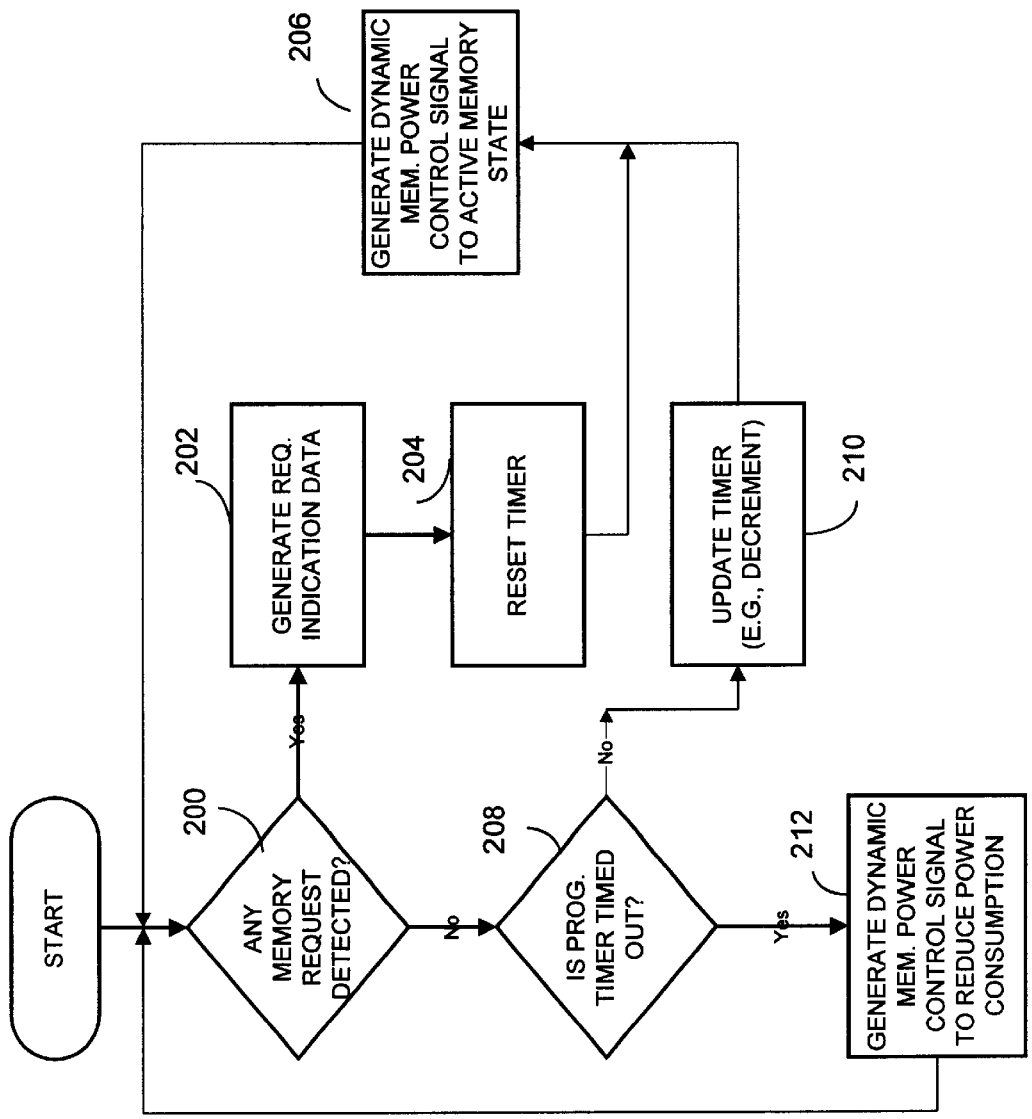
FIG. 5 is a flow chart illustrating one example of the operation of the circuit shown in FIG. 4.

Referring to FIG. 5, the memory request detector 126 and dynamic power controller 128 may operate by the memory request detector determining whether any memory requests have been detected during normal active mode operation (i.e, system non-standby/suspend mode) as shown in block 200. If a memory request has been detected from any of the memory request engines, the memory request detector generates the request indication data as shown in block 202. As shown in block 204, the programmable timer is then reset and the dynamic power controller 128 generates the dynamic memory power control signal 136 to dynamically control the memory to be in an active memory operational state as shown in block 206.

If, however, the memory request detector 126 does not detect a memory request, as shown in block 208, the logic 164 determines if the programmable timer has timed out through the value of the request activity information 162, such as count data. If the programmable timer has not timed out, the dynamic power controller 128 through logic 164 updates the timer, such as decrementing the timer, as shown in block 210. If the programmable timer has timed out, the dynamic power controller 128 will then generate the dynamic memory power control signal 136 to reduce power consumption of the graphics and/or video memory. Hence, the apparatus detects active mode memory idle periods and powers down the frame buffer memory during these periods to save energy.

As such, the disclosed system may, if desired, serve as a subsystem memory power reduction system to complement a system level controlled standby and suspend command operation. For example, the dynamic graphics and/or memory power reducing apparatus is in operation during non-standby and non-suspend modes. As such, a second level of power reduction is provided by the above-described system and method. Also, the memory request detector may be any suitable logic or software that detects memory requests. Similarly, the dynamic power controller may be any suitable combination of hardware or software, data processor, state machine, controller or other apparatus that operates as described above.

It should be understood that the implementation of other variations and modifications of the invention in its various aspects will be apparent to those of ordinary skill in the art, and that the invention is not limited by the specific embodiments described. For example, the disclosed apparatus and methods may be suitably applied to systems employing multiple memories and or multiple memory controllers. It is therefore contemplated to cover by the present invention, any and all modifications, variations, or equivalents that fall within the spirit and scope of the basic underlying principles disclosed and claimed herein.

What is claimed is:

1. A dynamic graphics and/or video memory power consumption reducing circuit comprising:
   at least one memory request detector that generates memory request indication data based on detection of graphics and/or video memory requests in a graphics processing subsystem; and
   at least one dynamic memory activity based power controller, operatively responsive to the memory request indication data, operative to control power consumption of the graphics and/or video memory based on whether graphics and/or video memory requests are detected within a predetermined time period.

2. The circuit of claim 1 wherein the dynamic memory activity based power controller reduces power consumption of the graphics and/or video memory based on inactivity of memory requests within the predetermined time period.

3. The circuit of claim 2 wherein the dynamic memory activity based power controller controls a memory clock enable signal of the graphics and/or video memory to reduce power consumption of the graphics and/or video memory.

4. The circuit of claim 1 wherein the memory request detector directly detects memory requests from a memory request generator or indirectly detects memory requests.

5. The circuit of claim 1 including control logic operatively responsive to the memory request indication data for indicating whether to reduce power consumption based on the memory request indication data.

6. The circuit of claim 1 wherein the at least one memory request detector generates memory request indication data based on detection of graphics and/or video memory requests for a plurality of memories each containing at least graphics data and/or video data.

7. The circuit of claim 5 wherein the control logic includes a programmable timer that is updated during memory request inactivity and reset based on memory request activity to calculate the predetermined time period.

8. The circuit of claim 1 wherein the memory request detector is operatively coupled to a request arbitor that arbitrates among a plurality of graphics and/or video memory requests prior to the memory request detector generating memory request indication data based on detection of graphics and/or video memory requests.

9. The circuit of claim 1 wherein the memory request detector and the dynamic memory activity based power controller are part of a display data memory controller in a graphics processing system.

10. A dynamic graphics and/or video memory power consumption method comprising the steps of:
    generating memory request indication data based on detection of graphics and/or video memory request activity in a graphics processing subsystem; and
    controlling power consumption of the graphics and/or video memory based on whether graphics and/or video memory requests are detected within a predetermined time period.

11. The method of claim 10 including reducing power consumption of the graphics and/or video memory based on inactivity of memory requests within the predetermined time period.

12. The method of claim 11 wherein the step of reducing power consumption includes controlling a memory clock enable signal of the graphics and/or video memory to reduce power consumption of the graphics and/or video memory.

13. The method of claim 10 wherein the step of detection includes directly detecting memory requests from a memory request generator or indirectly detecting memory requests.

14. The method of claim 10 including generating memory request indication data based on detection of graphics and/or video memory requests for a plurality of memories each containing at least graphics data and/or video data.

15. The method of claim 10 including updating a programmable timer that is updated during memory request inactivity and reset based on memory request activity to calculate the predetermined time period.

16. The method of claim 10 wherein the step of detection includes detecting a static display screen condition to facilitate reduced power consumption of graphics and/or video memory in the graphics processing subsystem.

17. The method of claim 10 including the step of arbitrating among a plurality of graphics and/or video memory requests prior to a memory request detector generating memory request indication data based on detection of graphics and/or video memory requests.

18. A dynamic graphics and/or video memory power consumption reducing circuit comprising:
    at least one memory request detector that generates memory request indication data based on detection of graphics and/or video memory requests, wherein the memory request detector detects a static display screen condition to facilitate reduced power consumption of graphics and/or video memory in a graphics processing subsystem; and
    at least one dynamic memory activity based power controller, operatively responsive to the memory request indication data, having control logic operative to control power consumption of the graphics and/or video memory based on whether graphics and/or video memory requests are detected within a predetermined time period, wherein the control logic includes a programmable timer that is updated during memory request inactivity and reset based on memory request activity.

19. The circuit of claim 18 wherein the at least one memory request detector generates memory request indication data based on detection of graphics and/or video memory requests for a plurality of memories each containing at least graphics data and/or video data.

20. The circuit of claim 18 wherein the memory request detector is operatively coupled to a request arbitor that arbitrates among a plurality of graphics and/or video memory requests prior to the memory request detector generating memory request indication data based on detection of graphics and/or video memory requests.

21. The circuit of claim 20 wherein the memory request detector and the dynamic memory activity based power controller are part of a display data memory controller in a graphics processing system.

22. A dynamic memory power consumption reducing circuit, comprising:
  a memory request detector operative to generate memory request indication data based on detection of frame buffer memory requests; and
  a dynamic memory based power controller, operatively responsive to the memory request indication data, to control power consumption of frame buffer memory during system active modes based on the memory request indication data within a predetermined time period.

23. The circuit of claim 22, wherein the frame buffer memory further includes graphics and/or video memory.

24. The circuit of claim 22, wherein the dynamic memory based power controller controls a memory clock enable signal of the frame buffer memory to reduce power consumption of the frame buffer memory.

25. The circuit of claim 22, wherein the memory request detector detects memory requests from a memory request generator or indirectly detects memory requests.

26. The circuit of claim 22, further including control logic operatively responsive to the memory request indication data for indicating whether to reduce power consumption based on the memory request indication data.

27. The circuit of claim 26, wherein the control logic includes a programmable timer that is updated during memory request inactivity and reset based on frame buffer memory request activity.

28. The circuit of claim 22, further including a request arbitor, operatively coupled to the memory request detector, to arbitrate among a plurality of frame buffer memory requests prior to the memory request detector generating memory request indication data based on detection of frame buffer memory requests.

29. A graphics and/or video memory power consumption reducing circuit, comprising:
  a memory request detector operative to generate request indication data based on detection of graphics and/or memory requests from at least one request engine; and
  a power controller, operative to power down the entire graphics and/or video memory based on whether graphics and/or video memory requests are detected within a predetermined time period.

30. The graphics and/or video memory power consumption reducing circuit of claim 29, wherein the graphics and/or frame buffer memory includes a frame buffer memory, and further including control logic operatively responsive to the memory request indication data for indicating whether to power down the graphics and/or video memory based on the memory request indication data.

31. The graphics and/or video memory power consumption reducing circuit of claim 30, wherein the control logic includes a programmable timer that is updated during memory request inactivity and reset based on frame buffer memory request activity.

32. The graphics and/or video memory power consumption reducing circuit of claim 29, further including a request arbitor, operatively coupled to the memory request detector, to arbitrate among a plurality of frame buffer memory requests prior to the memory request detector generating memory request indication data based on detection of frame buffer memory requests.

* * * * *